June 29, 1965
R. F. SIMON
3,191,986
MOTOR VEHICLE SUN VISOR
Filed March 19, 1962
FIG. 1
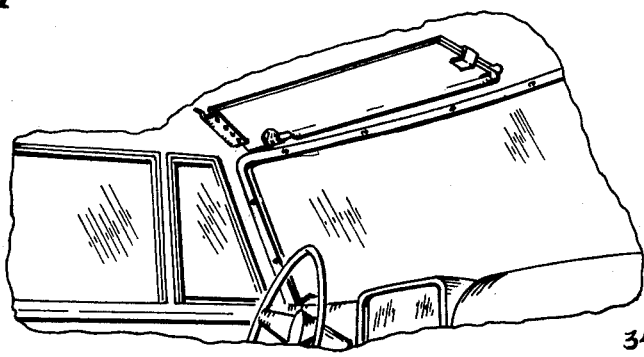
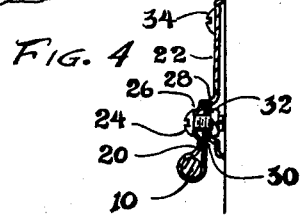
FIG. 2
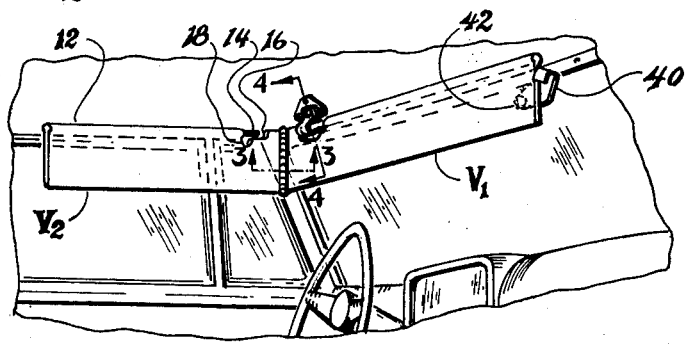
FIG. 3
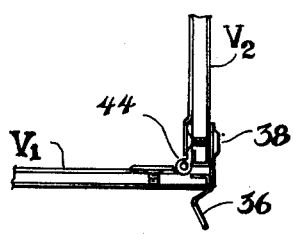
FIG. 5
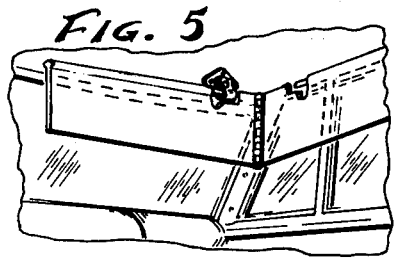
INVENTOR.
ROSERNA F. SIMON
BY
HERBERT C. SCHULZE
ATTORNEY

United States Patent Office 3,191,986
Patented June 29, 1965

3,191,986
MOTOR VEHICLE SUN VISOR
Roserna F. Simon, 1820 Via Norte, Palm Springs, Calif.
Filed Mar. 19, 1962, Ser. No. 180,517
1 Claim. (Cl. 296—97)

This invention relates generally to motor vehicle sun visors and particularly to auxiliary glare shields associated therewith.

One of the main objects of the invention is in the provision of a dual visor that simulates normal appearance but is movable to a side glare shielding position.

Another object of this invention is to provide a dual type of glare shield for both sides of a motor vehicle that utilizes a single form of visor.

The prior art discloses and commercial use has developed various kinds of dual visors or auxiliary glare shields for motor vehicles. All of such earlier devices are complicated of structure, expensive of manufacture and difficult of assembly on the motor vehicle.

It is fundamental in the present invention as indicated by the disclosed preferred embodiment thereof that the shields be of similar size, shape and construction so that their overlapping or piggy-back arrangement result in almost exact simulation of the conventional single visor. It is intended that a single form of shield be fashioned in such manner that it can be hinged to another similar visor and a mounting bracket in such manner that assembly may be made on either side of the vehicle without modification of parts.

Yet another object of the invention is to provide an overlapping and connected arrangement of dual glare shields with a mounting bracket that can be attached to either side of a motor vehicle without change.

It is still another object of the invention to provide glare shields of similar form that can be connected for dual purpose and interchangeably attached to mounting brackets on either side of a motor vehicle.

A further object of the invention is in the provision of connected, overlapping similarly formed glare shields that are movably connected to a mounting attachable to the conventional fittings of any modern motor vehicle.

A still further object of the invention is to provide a dual visor that simulates single appearance and is attachable to the conventional fittings.

Still another object of the invention is to provide a single style and form of visor that is adaptable to dual overlapping connection and simple assembly on either side of a motor vehicle by simple manual manipulation on the mounting bracket.

The foregoing and other objects and advantages of this invention will be clear to those skilled in the art upon reading the following specification in conjunction with the attached drawings in which:

FIGURE 1 is a perspective view of a preferred embodiment of the invention with the dual visors in overlapping position;

FIG. 2 is a perspective view of the device in extended or side glare shielding position;

FIGURE 3 is a sectional view taken on the line 3—3 of FIGURE 1;

FIGURE 4 is a sectional view taken on the line 4—4 of FIGURE 2; and

FIGURE 5 is a perspective view of the dual visor mounted on the right interior of the motor vehicle.

Referring to the drawings, a dual type sun visor is disclosed in the several views. The visor simulates in overall appearance the conventional glare shield mounted in all kinds and makes of motor vehicles. The visors which have been identified as $V^1$ and $V^2$ are identical in construction. An upper rod 10 in each visor has a glare shield portion 12 secured thereto. The manner of fashioning the glare shields 12 as far as attachment to the rods 10 and covering material is a matter of choice. It is important that the shields be similar in structure and confirmation so as to permit simplicity of manufacture, ease of assembly and a relatively inexpensive product.

The rods 10 do not extend along the entire top edge of the visors. An uncovered inner stub end 14 of each rod 10 extends into a recess or cutaway portion 16 of each visor. An open ended circular recess 18 in each shield portion 12 communicates with the slot 16. An expandable metal clip 20, clamped about the stub end 14 of the rod 10, is detachably and adjustably connected to a conventional mounting 22. The connection is made by a screw headed threaded bolt 24 that passes through apertures 26 and 28 in the open ends of the clip 20 and an opening 30 in the mounting 22. A nut 32 on the bolt 24 completes an assembly which accomplishes movable securement of the visor in the clip 20, and movable connection of the clip 20 on the mounting 22 which is secured in fixed position in the interior of the motor vehicle by means of screws 34.

The visors $V^1$ and $V^2$ are hingedly connected at 44 for overlapping assembly that simulates single glare shield appearance. A spring latch 36 secured at 38 to the shield $V^2$ provides releasable means for holding the visors in position with visor $V^1$ before the front windshield and the visor $V^2$ alongside the window of the left or driver's car door. Any type of releasable latching mechanism can be used. A manually actuated open ended latch 40 pivotally connected at 42 to the visor $V^1$ provides means for releasably associating the shields in overlapping position as shown in the drawings.

The operation of the dual sun visor is simple. The glare shields may be secured by the latch 40 in overlapping position whereby the device simulates in appearance and operates exactly as does the conventional single shield. The visor $V^2$ may be extended and held in sideward glare shielding position by the releasable latch 36. The rod 10 of the visor $V^1$ is rotatable in the clip thereby simulating standard glare shield movement. The shield attached rod 10 is also movable in clockwise or counterclockwise manner because of the releasable clamped connection of the clip 20 on the fixed mounting 22. The device has conventional glare shield movement. The device when secured in overlapping position is permitted full upward, or out of the way movement, because the clip 20 is receivable in the circular recesses 18 in the shields.

The visors $V^1$ and $V^2$ are identical or substantially identical in structure. Therefore, the device may be mounted on either side of the vehicle body without change. It is merely necessary to release the clip 20 from the mounting 22 and rod 10 and place it on the stub end of the overlapping visor $V^2$. The same glare shield assembly may then be detachably secured to a conventional mounting 22 on the opposite side of the motor vehicle.

It is intended that the device be constructed for simplicity of manufacture at relatively low cost. Assembly on any type or make of motor vehicle is merely a matter of special detachable clip connection to the standard form of mounting.

While I have shown and described in considerable detail what I believe to be the preferred form of my invention, it will be apparent to those skilled in the art that many changes may be made in the shape and arrangement of the several parts without departing from the broad scope of the invention, as defined in the following claim.

I claim:

A dual motor vehicle sun visor, comprising:
a mounting bracket having a visor rod clamp pivoted for movement thereon, said bracket adapted to be fastened to the upper inside corner of the passenger-carrying body;

a substantially horizontally directed rod having its inner end supported in said clamp for rotative frictional engagement therewith;

a first front sun visor attached to said rod, said first visor being cut away about said bracket and clamp for rotative movement thereabout and having a wing extension spanning the windshield and extending into the upper inside corner of the vehicle body;

a second sun visor conforming in overall shape to said first sun visor and being cut away about said bracket and clamp and having a similar windshield spanning corner wing extension; and a hinged connection at the ends of said wing extensions of said first and second visors, whereby front and side positions may be easily manipulated by a driver to any desired degree of universal adjustment.

References Cited by the Examiner
UNITED STATES PATENTS

| | | | |
|---|---|---|---|
| 1,191,172 | 7/16 | Fuller. | |
| 1,538,726 | 5/25 | Moran | 16—142 |
| 1,898,276 | 2/33 | Van Dresser | 296—97 |
| 2,045,751 | 6/36 | Burlein | 296—97 |
| 2,072,648 | 3/37 | Randall | 296—97 |
| 2,252,715 | 8/41 | Levy | 296—97 |
| 2,323,072 | 6/43 | Murata | 296—97 |
| 2,965,416 | 12/60 | Dryden | 296—97 |

A. HARRY LEVY, *Primary Examiner.*

BENJAMIN HERSH, *Examiner.*